United States Patent

[11] 3,629,830

[72] Inventors Gordon George Scarrott
Welwyn Garden City;
Thomas M. McCormick, Clifton, both of England

[21] Appl. No. 879,687
[22] Filed Nov. 25, 1969
[45] Patented Dec. 21, 1971
[73] Assignee International Computers Limited
London, England
[32] Priority Nov. 30, 1968
[33] Great Britain
[31] 56,959/68

[54] CHARACTER RECOGNITION APPARATUS
4 Claims, 1 Drawing Fig.

[52] U.S. Cl. .................................................... 340/146.3 H
[51] Int. Cl. .................................................... G06r 9/04
[50] Field of Search ........................................ 340/146.3

[56] References Cited
UNITED STATES PATENTS 3,069,079 12/1962 Steinbuch et al. ............ 340/146.3
3,189,873 6/1965 Rabinow ...................... 340/146.3
3,407,386 10/1968 Spanjersberg ................ 340/146.3

*Primary Examiner*—Thomas A. Robinson
*Attorney*—Hane & Baxley

ABSTRACT: A character recognition apparatus with a plurality of sensing devices arranged in a line for scanning elemental character areas in a direction perpendicular to the line. Scan signals are applied through corresponding preprocessing networks each of which includes horizontal and vertical center line detectors. The output of the detectors are combined in a gate which in turn produces a pulse whenever center lines are detected. The gate output pulse is held in a shift register with the contents of the shift register being examined by a logic circuit and decoder to determine whether a vertical portion of a character is being sensed with the decoder output being an outline of the character. The outline is then applied to a character recognition circuit. A white level detection circuit is provided to inhibit operation of the gate when blank paper is being sensed.

PATENTED DEC 21 1971 3,629,830
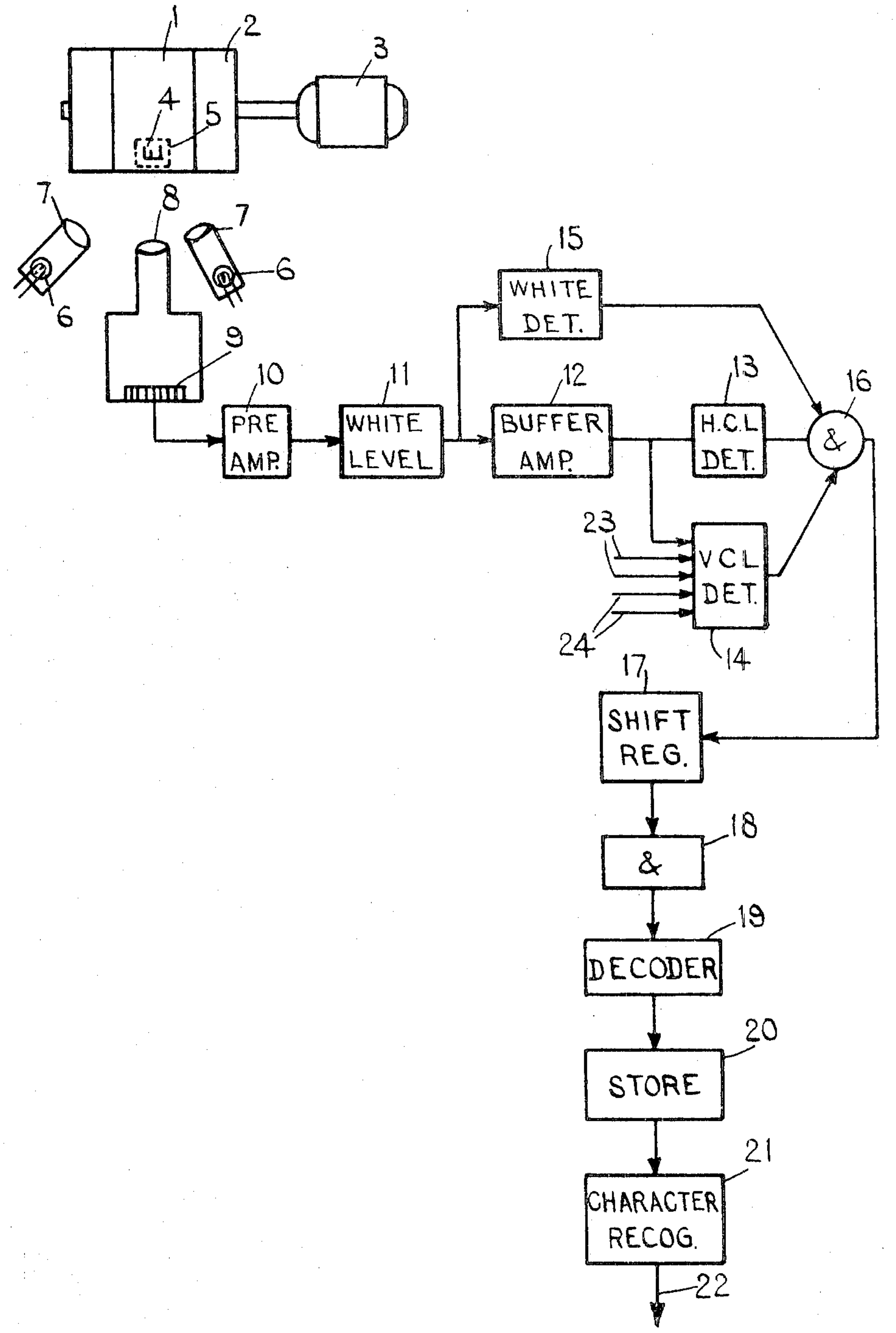
INVENTORS
GORDON GEORGE SCARROTT
THOMAS MICHAEL MCCORMICK
BY Kane and Baxley
ATTORNEYS

CHARACTER RECOGNITION APPARATUS

FIELD OF THE INVENTION

This invention relates to apparatus for recognizing characters. Elemental character areas are scanned by sensing devices each of which, in turn, produces a scan signal for a corresponding area. The scan signals are then preprocessed and subsequently applied to a character recognition circuit.

DESCRIPTION OF PRIOR ART

Many different systems have been proposed for identifying characters. Typically, a printed character is viewed by an optical system which generates a group of electrical signals representing the shape of the character. These signals are stored and are analyzed to determine the identity of the particular character amongst the possible set of characters. The identification procedure may depend upon the detection of features on the character, such as vertical or diagonal lines and line intersections, or upon matching or cross correlation techniques which utilize the entire pattern.

Imperfections in the printing process, and/or the paper on which the character is printed, produce irregularities in the character outline. Such irregularities generate spurious signals which may cause uncertainty or error in the identification of the character. Clearly, the process of identification can be simplified if the signals can be preprocessed to remove to a large extend the effect of irregularities in the character and to produce a standardized character outline for identification. These preprocessing techniques include character amplitude normalization, size normalization and object isolation. A review of these techniques may be found in the Proceedings of the I.E.E.E., May 1968, page 950.

A preprocessing system has already been proposed in which the output signals derived from scanning a printed character are operated upon in an iterative manner to produce output signals which represent an approximation to the centerline of the original printed character. The operations upon the input signal consist essentially in deriving for each point in the character outline a value which represents the number of different connected paths that begin at that point and lie within a specified area of the character outline surrounding that point. The value developed for each input signal results from passing the signal through a circuit representative of a connectivity function in an iterative manner. Such preprocessing systems, aside from developing a complex connectivity function for each input signal, require that the input signal be passed through the circuit, or operated on, several times thereby increasing the time necessary to preprocess each input signal.

SUMMARY

According to the invention apparatus for recognizing characters includes a plurality of sensing devices for examining a plurality of elemental areas of a character area, the elemental areas being in alignment, means for causing each sensing device to scan across the character area perpendicular to said alignment, each sensing device producing a scan signal indicating the occurrence of parts of a character line in its scan path, first means responsive to the scan signal from a sensing device to produce a signal when the sensing device is, in the direction of said alignment, over the center of a character line, a horizontal line center signals, second means responsive to said scan signal and to the scan signal from other ones of the sensing devices to produce a signal when that sensing device is, in a direction normal to said alignment, over the center of a character line, a vertical line center signal, means for combining the horizontal and vertical line center signals to produce coincidence signals, means responsive to the coincidence signals to produce signals representing an outline of a sensed character, and character recognition means responsive to the outline representing signals.

BRIEF DESCRIPTION OF THE DRAWINGS

One embodiment of the invention will now be described with reference to the accompanying drawing in which:

The sole FIGURE shows a diagrammatic view of the character recognition apparatus.

DESCRIPTION OF THE PREFERRED EMBODIMENTS

A document 1 is mounted on the surface of a drum 2, which is rotated at a substantially constant speed, by a motor 3. The document carries printed characters, one of which is shown at 4 on an enlarged scale, which are to be recognized. Each character may be considered as being located within a character area, which is indicated by dotted lines 5.

A small area of the document is brightly illuminated by a pair of lamps 6, each of which has a conventional optical system indicated at 7. An optical system 8 images a part of the illuminated area on a row of photocells 9. The length and width of the row of photocells and the magnification of the optical system 8 is such that a narrow strip of the full width of the character area is projected on to the photocells. This area may be approximately 3 times the height of a character, to allow for vertical misalignment of the character. For example, there may be 50 photocells 9, the average height of a character being such that it extends across 17 of the 50 cells. The width of the photocells, which may be determined by a mask, is such that the width of the scanned strip of the character is not greater than the minimum permissible thickness of a vertical limb or line of the character. The movement of the drum causes the image of the character to pass across the row of photocells. Thus, the image may be considered as being broken down into a matrix of elemental areas. The matrix is 17 elements in one direction, corresponding to the 17 photocells which cover the height of the character, and, say, 11 elements in the other direction, corresponding to 11 adjacent nonoverlapping scan strips covering the maximum width of the character. In general, the number of elements in the rows and columns of the matrix is selected in accordance with the requirements of the character recognition circuits to which the scan signals from the photocells are fed ultimately.

For the sake of clarity, the circuits associated with only one of the photocells 9 are shown in the drawing, the circuits for the other cells being generally similar. The output from the photocells is fed to a preamplifier 10. The signal from the preamplifier is fed to a white level restoration circuit 11, which provides an output signal which has a predetermined baseline which is independent of reasonable variations in the level of illumination and the reflectivity of the surface of the document 1.

The standard level signal is fed through a buffer amplifier 12 to a horizontal line center detector 13 and a vertical line center detector 14. The detailed operation of these circuits will be referred to hereinafter. However, in broad terms, both circuits detect whether, or not, the character outline which is being scanned is changing in the particular direction. The condition of no change is provided both by a black level, from a portion of a character line and by a white level, from blank paper. Accordingly, the standard level signal is also fed to a white level detection circuit 15, which applies an inhibiting signal to an AND-gate 16 if the signal level corresponds to the sensing of blank paper. The outputs from the circuits 13 and 14 are also applied to the gate 16, so that the gate provides an output only if the line center conditions of the circuits 13 and 14 have been met and blank paper is not being sensed.

The line center conditions are such that if the scan area at a particular moment coincides with a vertical limb of the character, which is equal to the width of the scan area, an output will be available from the gate 16. However, the limb width of a heavily printed character may be several times the width of the scan area, so that it can produce several successive outputs from the gate. Alternatively, several successive outputs from one, or more, photocell channels may be produced by scanning a horizontal, or a diagonal, limb.

In order to produce the required line center representation of the sensed character outline, it is necessary to determine whether or not a vertical portion of the character outline is being scanned. The output from the gate 16 if fed to a shift register 17. The individual stages of the register are connected to a network 18 of AND gates, the outputs of which are connected to a decoder 19. The effect of the network 18 and the decoder 19 is to generate a single pulse if the register contains not more than a predetermined number of pulses, which is the number of pulses produced for a vertical limb of the maximum expected width. This number may be five, for example, when the scan area has the relative dimensions set out earlier. The decoder 19 provides an output pulse corresponding to the center pulse of any group of pulses not exceeding five in number, the first pulse of the group being eliminated if the number of pulses is initially even. If the number of pulses stored in the register is greater than five, more than one output is produced by the decoder, for example, in the case of six pulses, the output may correspond to the third and fourth pulses. The decoder may include one, or more, delay lines with a multiplicity of tappings, so that the correct relative timing of the output pluses and the input to the shift register is maintained.

The output from the decoder may be fed to a matrix store 20, so that all the signals representing elements of the character may be reassembled. The pattern representing one complete character is then transferred to a character recognition circuit 21, which provides an output on line 22 indicating which particular character of the set has been sensed. The operation of the store and recognition circuit will not be described in detail, since they are similar to known devices which have been used in systems which do not employ preprocessing of the scan signals. The store may not be necessary if the recognition circuits are of the kind which operate serially on the signals produced by successive scans, rather than on a complete character pattern.

Returning now to a consideration of the line center detection circuits, the information relating to the horizontal limbs of the character outline is spatially quantized in that the signals at any moment are coming from a row of individual photocells. Broadly, a cell is scanning a line center position if the relationship of the outputs of the adjacent cells on either side of that cell have a logical symmetry. For example, if five adjacent cells A to E are sensing a limb, cell C, or cells B C D, or all cells may be scanning all black when cell C is on the center of the limb or line, depending upon the width of the limb. However, if only cells A B C are scanning black, it is clear that cell C is not on the line center. When a diagonal limb is being scanned, a different set of conditions apply. For example, cells B C D are scanning all black and cells A and E are scanning part black and part white.

The possible combinations of cell illumination for different limb widths and the various limb shapes and positions which occur for a particular character set may be determined by trial. This may be done for example, by superimposing a scan grid on typical examples of the characters. Having determined these combinations, the particular configuration of gates required to provide an output for all permissible line center conditions, and for no other conditions, may be derived by the normal processes of logical circuit design. However, the number of gates necessary to deal with all conditions may be substantial. At the same time, most character recognition circuits are tolerant of some error in the pattern to be recognized, that is, of a limited number of missing or misplaced elements.

It may be convenient in practice to utilize the tolerance of the recognition circuit to reduce the number of gates by utilizing simpler conditions which are not necessarily correct under all circumstances, but which deal satisfactorily with the circumstances which occur most frequently.

For example, using a particular matrix recognition circuit, it was found that a satisfactory standard of performance was obtained using the single vertical line center condition that:-
"$V_C = |(V_A+V_B)-(V_D+V_E)|$"

Where the subscripted V represents the voltage output from the corresponding photocell channel.

Thus, in the figure, lines 23 and 24 are connected to the outputs of the buffer amplifiers for the two adjacent and next adjacent cells on the both sides. The detector 14 then consists of two voltage summing circuits, a voltage subtraction circuit, and a circuit for comparing the difference voltage with the voltage output from the buffer amplifier 12.

The information available to the horizontal line center detector 13 is in analogue form, that is, it is a time variant voltage waveform. A convenient criterion for determining the line center condition is whether, or not, the amplitude of the cell output has changed more than a predetermined amount within a selected time interval. This condition is satisfied by continuous white, as well as continuous black. However, as noted earlier, the unwanted response to the continuous white is eliminated by the white detector 15 and the gate 16.

One convenient way of detecting changes in the cell output is to utilize the so-called sample and hold circuit. The amplitude of the input voltage to detector 13 is sampled at intervals of, say, 5 microseconds. The value of the sample is stored until the nest sampling time and is compared by a comparator with the new value of the input voltage just prior to this time. The comparator provides an output indicating a line center if the difference between the 2 voltages is less than some preset value.

An alternative detection system utilized delay lines which provide signal delays equal to the sampling period. Voltage comparators each receive the input signal and the output from one of the delay lines, so that the amplitude of the input signal may be compared with the amplitude of the signal in the same channel at one period, two periods, etc., earlier.

It will be apparent that the signal preprocessing system which has been described reduces each limb of a character to a single line of elements, at least in the ideal case. It may be that the recognition circuit 21 operates most efficiently on a wider line of elements. In such a case, each single line of elements may be expanded in width, for example, in the process of transfer to the store. Thus, an element may be added on each side of each element which is generated by the line center circuits. It may also be desirable to reduce the number of elements along the center line, that is, the resolution of the line center circuits may be greater than that of the character pattern which is finally presented to the recognition circuits.

It will be appreciated that the particular form of scanning which has been described is not essential to the invention. The line center circuits may be adapted readily for use with any arrangement which scans a character area in line segments.

We claim:

1. Apparatus for recognizing characters including a plurality of sensing devices for simultaneously examining a plurality of elemental areas of an area within which a character appears, the sensing devices being aligned, means for causing the sensing devices to scan across the character area perpendicular to their alignment, each sensing device producing a scan signal indicating the occurrence of parts of a character line in its scan path, first means responsive to the scan signal from a sensing device to produce a signal when that sensing device to produce a signal when that sensing device is, in the direction of said alignment, over the center of a character line, second means responsive to said scan signal from a sensing device and to scan signals from others of the sensing devices to produce a signal when that sensing device is, in a direction normal to said alignment, over the center of a character line, means for combining the signals from the first and second means to produce coincidence signals, means responsive to the coincidence signals to produce signals representing an outline of a sensed character, and character recognition means responsive to the outline representing signals.

2. Apparatus for recognizing characters as claimed in claim 1 including a white level detection circuit which is responsive to a scan signal and produces an output that inhibits the combining means from producing coincidence signals when a sensing device produces a scan signal indicative of the sensing of blank paper.

3. Apparatus for recognizing characters as claimed in claim 1 including a shift register arranged to receive said coincidence signals and circuit means for indicating that vertical portion of a character outline is being scanned by producing an output signal when the coincidence signals held in the shift register is below a predetermined number of signals.

4. Apparatus for recognizing characters as claimed in claim 3 in which the circuit means includes a network of AND gates and a decoder, the decoder producing a single output pulse corresponding to the center pulse of any group of signals in the shift register.

* * * * *